May 7, 1968  C. A. LARSEN  3,381,545

METALWORKING MACHINE

Original Filed Oct. 19, 1965  8 Sheets-Sheet 1

INVENTOR:
CHARLES A. LARSEN

BY: James E. Nilles
ATTORNEY

May 7, 1968  C. A. LARSEN  3,381,545
METALWORKING MACHINE
Original Filed Oct. 19, 1965  8 Sheets-Sheet 2

INVENTOR:
CHARLES A. LARSEN
BY: James E. Nilles
ATTORNEY

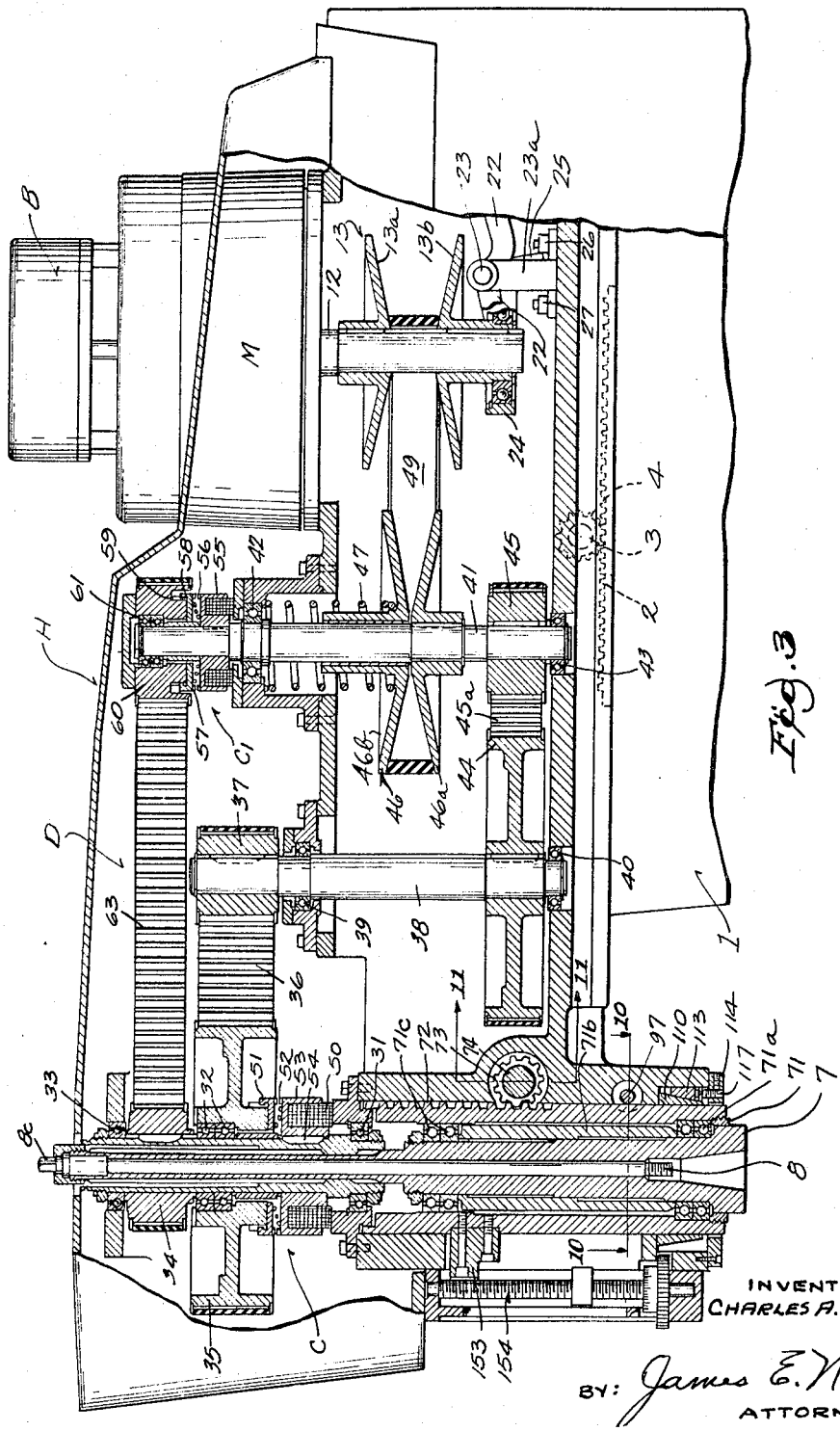

May 7, 1968 C. A. LARSEN 3,381,545
METALWORKING MACHINE
Original Filed Oct. 19, 1965 8 Sheets-Sheet 4
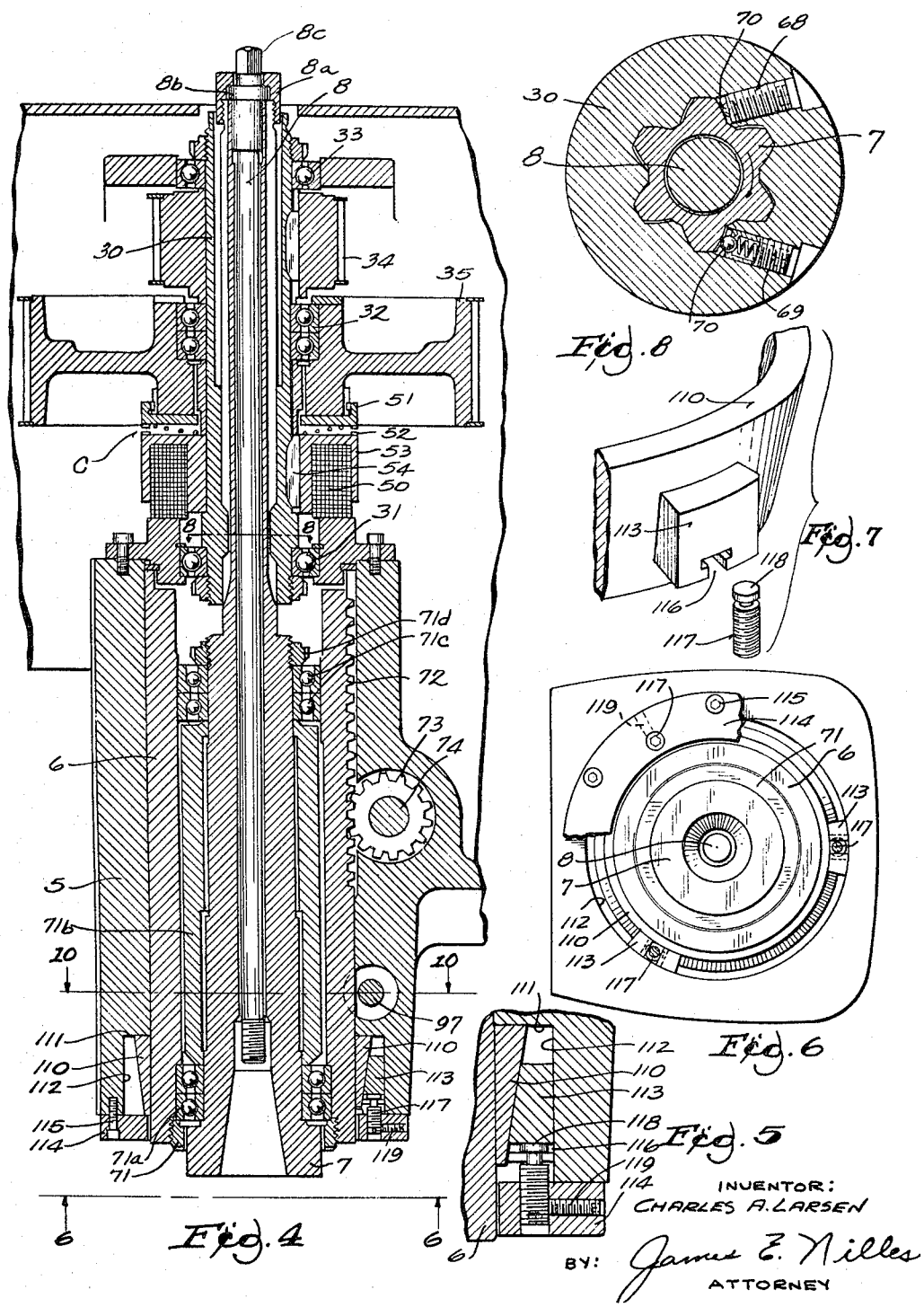
INVENTOR:
CHARLES A. LARSEN
BY: James E. Nilles
ATTORNEY May 7, 1968
C. A. LARSEN
3,381,545
METALWORKING MACHINE
Original Filed Oct. 19, 1965
8 Sheets-Sheet 5
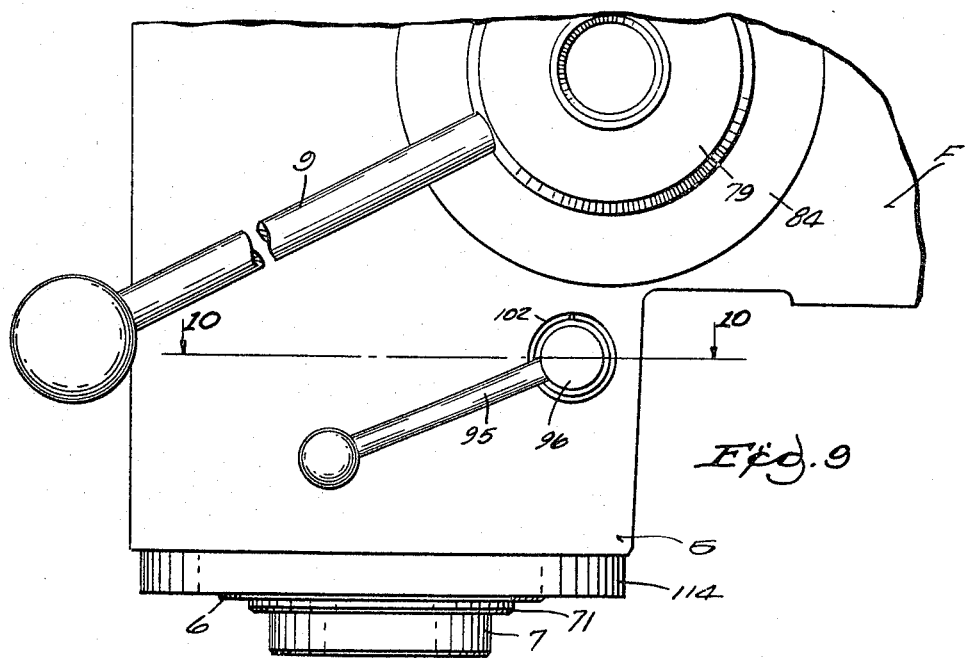
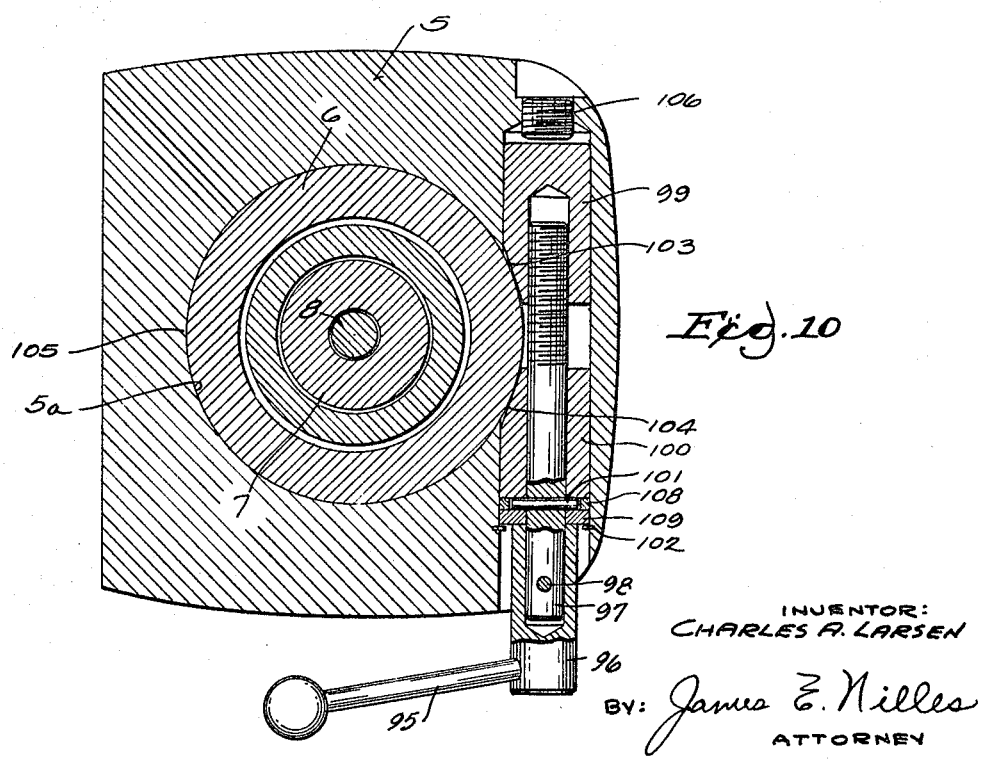
INVENTOR:
CHARLES A. LARSEN
BY: James E. Nilles
ATTORNEY

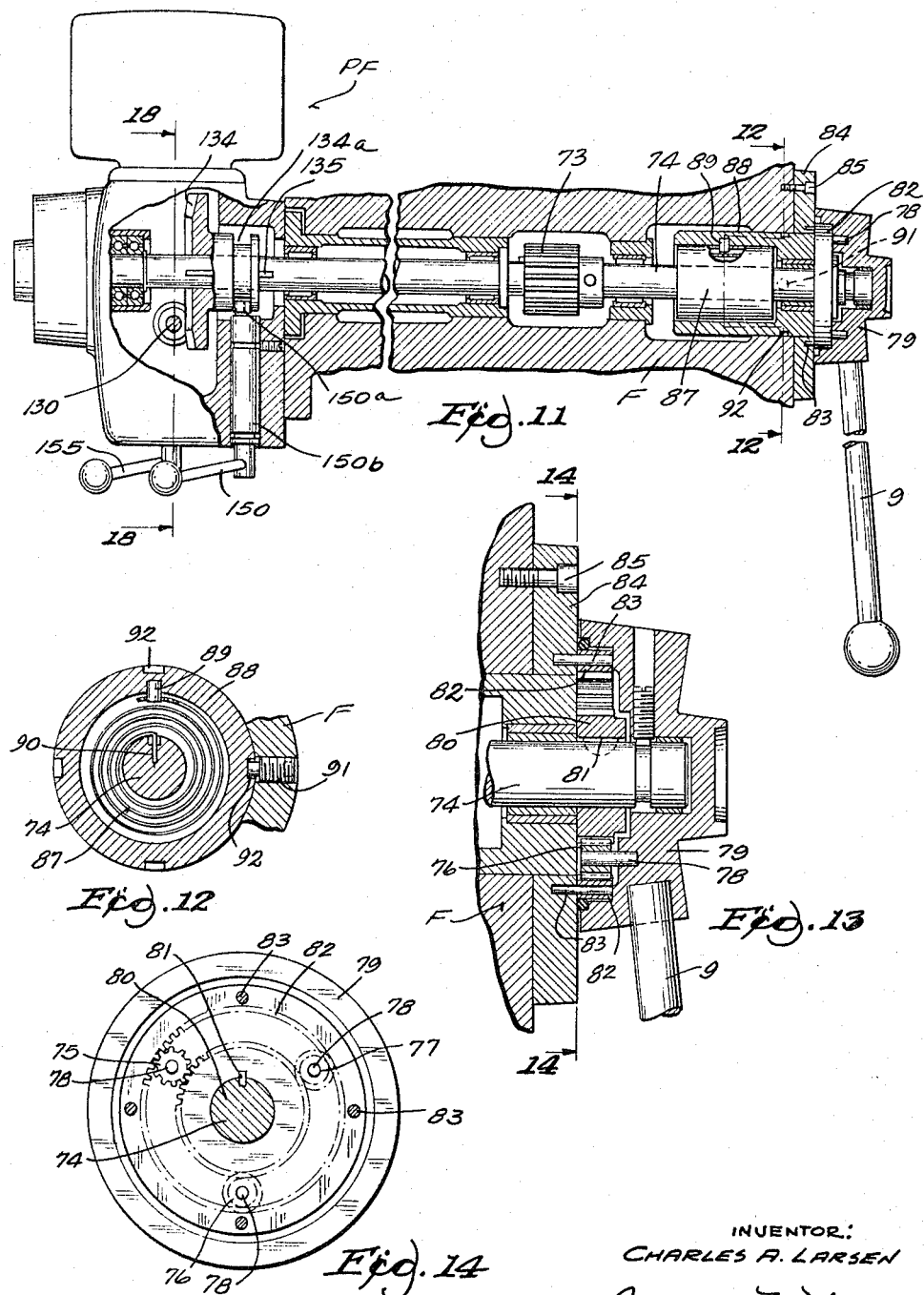

May 7, 1968 C. A. LARSEN 3,381,545

METALWORKING MACHINE

Original Filed Oct. 19, 1965 8 Sheets-Sheet 7

INVENTOR:
CHARLES A. LARSEN

BY: James E. Nilles
ATTORNEY

May 7, 1968  C. A. LARSEN  3,381,545
METALWORKING MACHINE
Original Filed Oct. 19, 1965  8 Sheets-Sheet 8
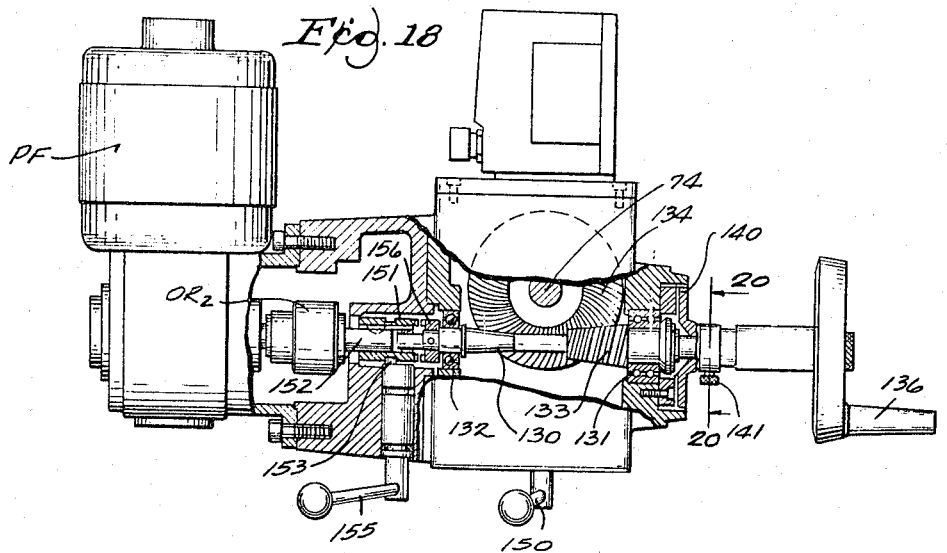
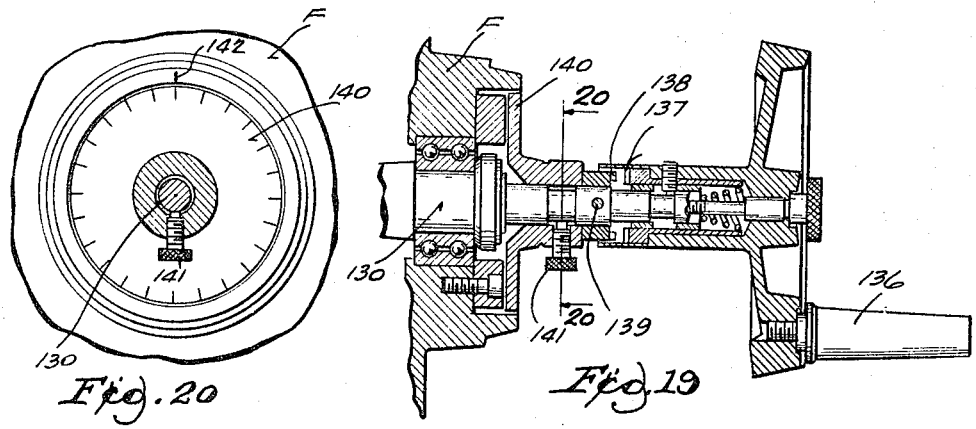
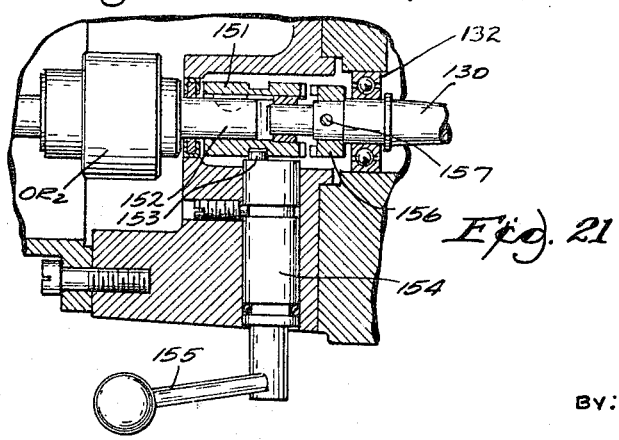
INVENTOR:
CHARLES A. LARSEN
BY: James E. Nilles
ATTORNEY

United States Patent Office 3,381,545
Patented May 7, 1968

3,381,545
METALWORKING MACHINE
Charles A. Larsen, Union Grove, Wis., assignor, by mesne assignments, to Gorton Machine Corporation, Racine, Wis., a corporation of Wisconsin
Original application Oct. 19, 1965, Ser. No. 497,821. Divided and this application Mar. 7, 1967, Ser. No. 636,227
6 Claims. (Cl. 74—722)

ABSTRACT OF THE DISCLOSURE

An infinitely variable drive mechanism for a tool-holding, rotatable spindle of a metalworking machine.

CROSS REFERENCE TO RELATED APPLICATION

This is a divisional application of U.S. patent application Ser. No. 497,821, filed Oct. 19, 1965, entitled "Metalworking Machine," which issued Mar. 19, 1968, as Patent No. 3,373,658.

BACKGROUND OF THE INVENTION

Various means have heretofore been proposed for rotatably driving the spindle, usually by gearing and speed reduction units. These prior art arrangements have various shortcomings, for example, they require lubrication, are costly to manufacture, noisy in operation, subject to misalignment, and have high friction losses which result in inefficiency.

SUMMARY OF THE INVENTION

This invention provides an improved drive mechanism for a spindle assembly in the head of a metal working machine, which drive is infinitely variable as to speed, requires no lubrication, is relatively inexpensive to manufacture, is quiet in operation, presents no appreciable misalignment problems in the drive train, and is particularly efficient in performing the functions for which it was designed.

BRIEF DESCRIPTION OF THE DRAWINGS

FIGURE 3 is a longitudinal, vertical, sectional view through the head of the machine shown in FIGURES 1 and 2, but on an enlarged scale;

FIGURE 4 is a vertical sectional view of the front portion of the head as shown in FIGURE 3, but on an enlarged scale;

FIGURE 5 is a detail, fragmentary, sectional view of a portion of the spindle assembly adjustment as shown in FIGURE 4 but on a further enlarged scale;

FIGURE 6 is a bottom view of the lower nose portion shown in FIGURE 4 the view being taken generally from along line 6—6 in FIGURE 4, and showing certain parts as being broken away;

FIGURE 7 is a fragmentary, perspective, exploded view of portions of the adjustment shown in FIGURES 4 and 5;

FIGURE 8 is an enlarged, sectional view taken along line 8—8 in FIGURE 4 and showing the driving connection between the drive sleeve and spindle assembly;

FIGURE 9 is a fragmentary, enlarged, elevational view of the lower end of the head shown in FIGURES 3 and 4, and showing the down feed handle and the spindle lock handle;

FIGURE 10 is a sectional view taken along line 10—10 in FIGURE 9 and showing the spindle clamp mechanism; this also represents a view taken along line 10—10 in FIGURES 3 or 4, but on an enlarged scale;

FIGURE 11 is a sectional view taken generally along line 11—11 in FIGURE 3 and showing the spindle assembly downfeed mechanism;

FIGURE 12 is a section view taken along line 12—12 in FIGURE 11 and showing the clock spring for counterbalancing the weight of the spindle assembly;

FIGURE 13 is a fragmentary enlarged, sectional view of the planetary mechanism shown as the right end in FIGURE 11;

FIGURE 14 is a sectional view taken along line 14—14 in FIGURE 13;

FIGURE 18 is an elevational view taken generally along line 18—18 in FIGURE 11, certain parts being shown as broken away and in section for clarity;

FIGURE 19 is an enlarged, sectional view of a portion of the depth adjusting mechanism shown in FIGURE 18;

FIGURE 20 is a sectional view taken along line 20—20 in FIGURE 18 and showing the dial for setting the depth of the tool; and FIGURE 21 is an enlarged, sectional, detail view of a portion of the throw-out clutch mechanism for the power feed.

GENERAL

Figure 1:
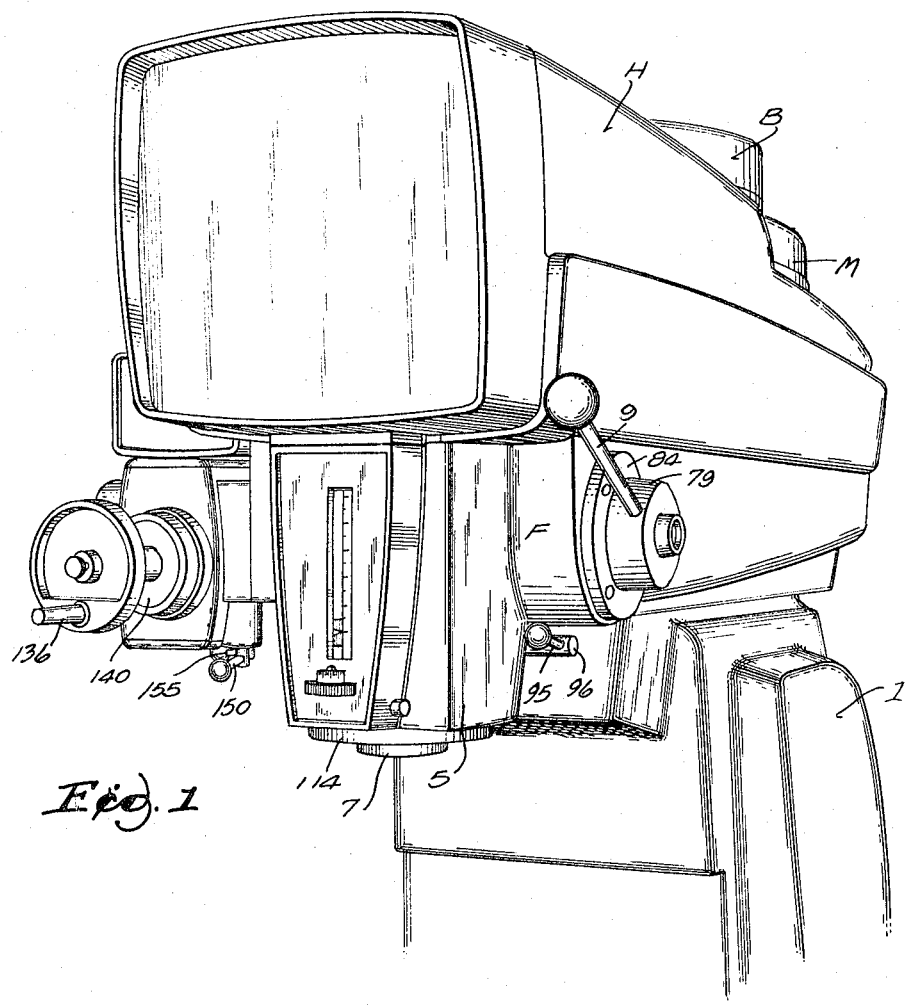
FIGURE 1 is a perspective view of a machine embodying the present invention.
Figure 2:
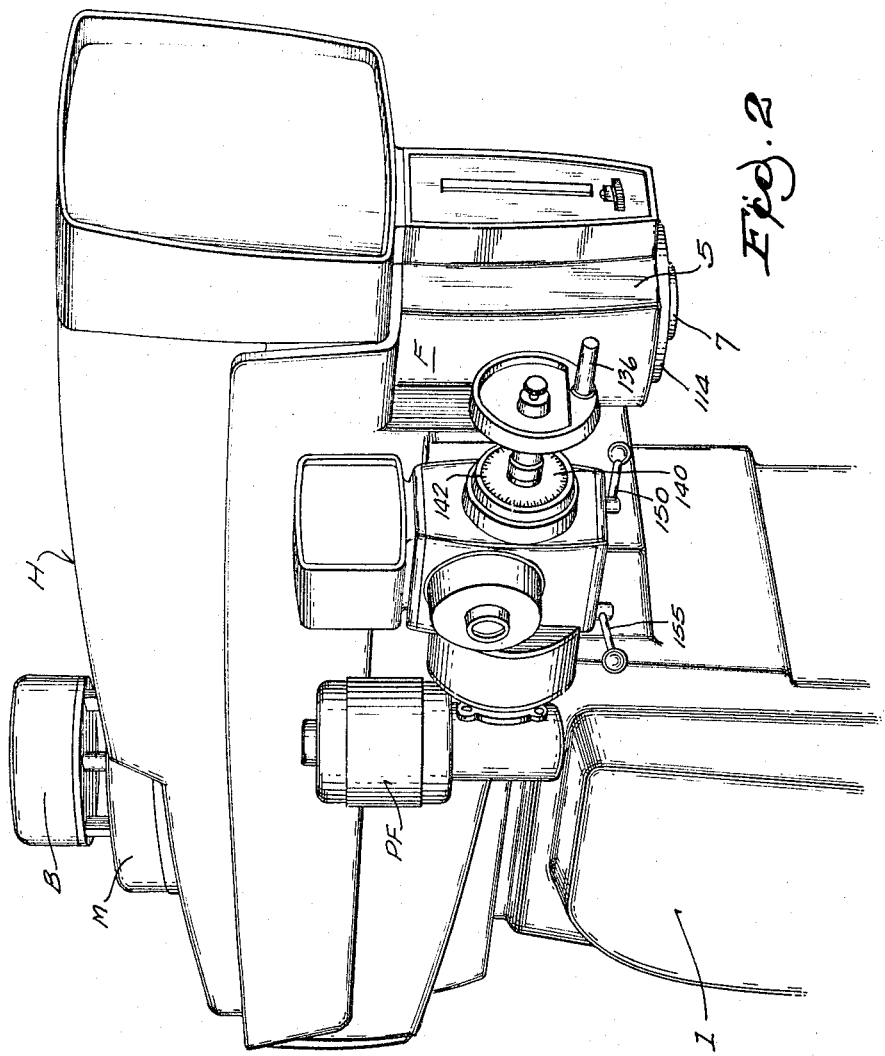
FIGURE 2 is another perspective view of the machine shown in FIGURE 1.

The general organization includes the improved head H mounted on top of a machine column 1 which has a gear rack 2 fixed thereto. A manually operated shaft 3 has pinion 4 fixed to it and which is in constant mesh with the rack 2. By rotating the shaft 3 the entire head can be adjusted to the left or right (as viewed in FIGURE 3) in respect to the machine column.

A casing 5 forms the front end of the head and has a spindle assembly 6 located therein which is adapted for vertical movement to position a tool which is clamped in the spindle 7 by the draw bar 8. A left hand nut 8a is threaded on the upper end of the spindle 7 and a flange 8b is formed on the upper end of the draw bar and the bar is held axially captive in the spindle 7 by the flange 8b. Rotating the square end 8c of the bar loosens or tightens the tool (not shown) in a conventional tapered tool holder (not shown) threaded on the lower end of bar 8. As will more fully appear hereinafter, this spindle is rotated through the improved drive means indicated generally at D by means of the electric motor M.

The spindle assembly 6 is urged to the down position by the manually operated handle 9 (FIGURE 11) or by means of the power feed mechanism PF.

DRIVE MECHANISM

Turning now to a more detailed description of the improved drive mechanism, the spindle may be driven either through a high speed transmission or through a low speed transmission.

Figure 15:
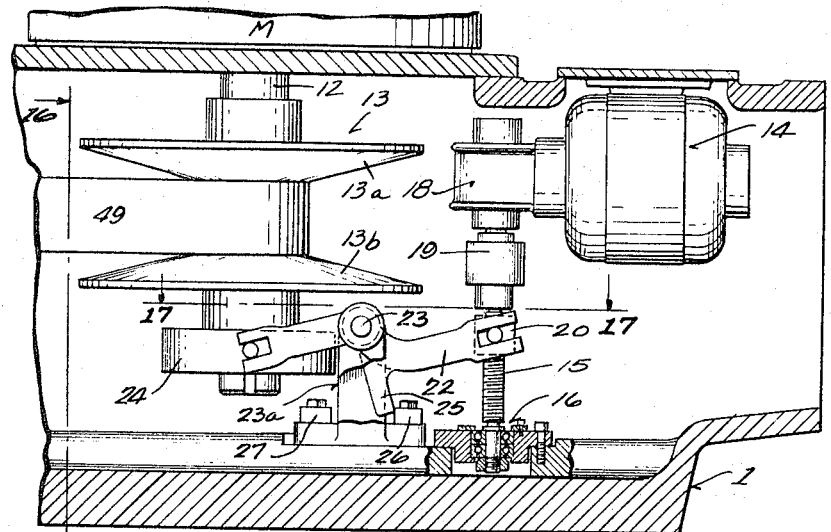
FIGURE 15 is an elevational, sectional view of the right end of the head as viewed in FIGURE 3, but on a slightly enlarged scale, certain parts being shown as broken away for clarity.
Figure 16:
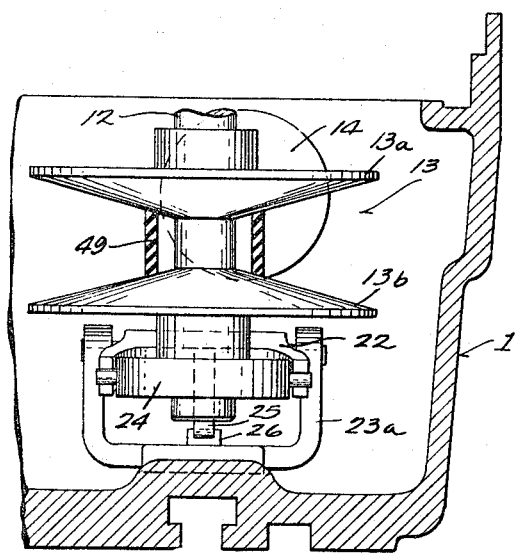
FIGURE 16 is a sectional view taken along line 16—16 in FIGURE 15.
Figure 17:
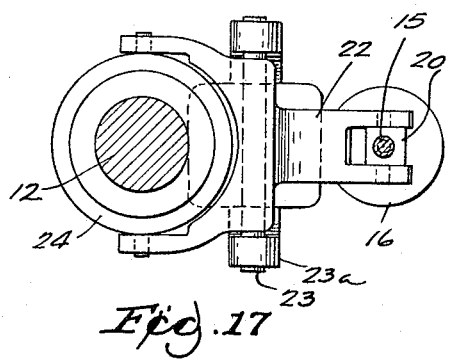
FIGURE 17 is a sectional view taken along line 17—17 in FIGURE 15.

Power for rotating the spindle is furnished from the electric motor M, having a suitable brake B, through its downwardly depending drive shaft 12 to which is attached a variable speed, adjustable sheave 13. Sheave halve 13a is axially fixed on shaft 12 while the sheave halve 13b is keyed to but axially slideable on shaft 12 and is adjustable thereon by a speed shifter mechanism as follows:

An electric, reversible motor 14 (FIGURE 15) is connected to the sheave halve 13b as follows. A threaded shaft 15 (FIGURE 15) is rotatably mounted in anti-friction bearings 16 and a torque limiting clutch 19. This shaft is rotated through the gear drive 18 and the torque limiting overrunning clutch 19 is provided in the shaft 15 to limit the amount of torque transmitted to shaft 15 to a predetermined amount, say for example, 17 inch lbs. of slip. A nut 20 is threaded on shaft 15 and can run along the shaft in either direction, depending on the rotation of the threaded shaft. An arm member 22 is pivotly mounted on shaft 23 in bracket 23a, and one end of the arm 22 is in engagement with the running nut 20. The other end of the arm 22 is in engagement with the shifting collar 24. A downwardly projecting portion 25 of the arm 22 is adapted to abut against either one of the stops 26 or 27 so as to limit the amount of pivotal movement of the arm 22, in either direction, and consequently limit the amount of travel of the sheave halve 13b. When the stop is engaged by arm portion 25, the clutch 19 simply overruns. Thus the electric motor M and the adjustment of the sheave 13 provides a quick and convenient, infinitely variable speed adjustment for either the high or low drive to the spindle 7 as follows.

Referring to FIGURE 4, the spindle 7 is surrounded by a drive sleeve 30 which in turn is rotatably mounted in the anti-friction bearing assemblies 31 and 33. A small gear 34 and a clutch C are keyed to drive sleeve 30. The larger gear 35 is part of the low speed drive train and has a timing belt 36 which connects it to a smaller timing gear 37 fixed to lay shaft 38. Shaft 38 in turn is suitably journalled in anti-friction bearing assembly 39 and 40. Another layshaft 41 is also suitably journalled in anti-friction bearings 42 and 43 in the frame. A large gear 44 is fixed to lay shaft 38 while a smaller gear 45 is fixed to lay shaft 41 and a timing belt 45a is trained around and thus drivingly connects both the gears 44 and 45. An adjustable sheave 46 is mounted on shaft 41 and is spring biased to the closed portion by spring 47. More specifically, the sheave halve 46a is axially fixed on shaft 41, while the sheave halve 46b is keyed but axially slideable on the shaft and is urged by the spring toward the fixed halve of the sheave. A V-belt 49 is trained around the sheaves 13 and 46 so that the speed ratio between the shafts can be infinitely adjusted.

In this manner a low speed drive can be provided from motor M through sheaves 13 and 46, and then through the gear and belt drive 45, 46, 44, 37, 36 and 35. It will be noted that gear 35 is rotatably mounted on the drive sleeve 30 on the anti-friction bearing assembly 32. The electrically operated clutch C is provided between the gear 35 and the drive sleeve so that a driving connection is made therebetween when the clutch is engaged. More specifically, when the electric coil 50 of the clutch C is energized, it sucks down the upper tooth member 51 into engagement with the teeth 52 of the collar 53. Collar 53 in turn is fixed by key means 54 so that when the clutch teeth 51 and 52 are engaged, the drive sleeve 30 is connected to the gear 35.

As shown best in FIGURES 4 and 8, the drive sleeve 30 is splined to the tool holder spindle 7 to drive the latter. Because of this spline connection, the tool holding spindle 7 can move vertically in and relative to the drive sleeve 30.

The high speed drive connection between the motor M and the drive sleeve also includes an electrically operated clutch C1 between shaft 41 and gear 60. More specifically, a collar 55 is keyed to shaft 41 and has a set of teeth 56 at its upper end adapted to be engaged by the clutch teeth 57 of the vertically shiftable member 58. Member 58 in turn is splined at 59 for axial movement in the intermediate timing gear 60. Timing gear 60 is rotatably mounted on anti-friction bearing assembly 64 on the upper end of shaft 41. A timing belt 63 is trained around gear 60 and gear 34.

Energization of the coil 55 clutches the gear 60 to shaft 41. The electrical arrangement is such that when clutch C is engaged, clutch C1 is disengaged and, vice versa, so that either the low speed or high speed drive can be selectively engaged as desired.

The above described drive mechanism requires no lubricant and therefore it is unnecessary to have a "wet head" which in turn would require numerous seals and lubricating devices, which are not only costly but require considerable maintenance. The drive mechanism is quiet in operation and is not subjected to misalignment difficulties as are other prior art devices. Furthermore, because of the low friction between the parts, the drive mechanism is particularly efficient and, as a result, runs much cooler than conventional devices.

Referring again to FIGURE 8 at the upper end of the assembly, a pair of threaded tubular members 68 and 69 are screwed into the drive sleeve 30 and each contain a spring loaded ball 70 bearing against the splines of the spindle 7 which acts to take up the back lash between the drive member and tool holder in one direction of rotation or the other.

At the lower end of the assembly, a lock nut 71 is threadably engaged in the lower end of the assembly 6 and holds the anti-friction bearings 71a tightly against the tubular spacer 71b. Anti-friction bearings 71c are located between the upper end of spacer 71b and a lock nut 71d.

SPINDLE ASSEMBLY POWER DOWNFEED

The means for feeding the spindle assembly in a downward direction are now to be described.

Referring to FIGURES 3 and 4 it will be noted that a rack of teeth 72 is formed along one side of the spindle which is constantly engaged by a pinion 73. As shown also in FIGURE 11, this pinion is fixed to the downfeed shaft 74, that is, oscillated by the feed lever 9 attached to one end thereof.

The downfeed lever 9 is attached to shaft 74 by means of a planetary gear arrangement (shown clearly in FIGURES 13 and 14) which provides very rapid and extensive vertical travel of the spindle assembly with relatively small arcuate swinging movement of the lever 9. This planetary arrangement includes three pinion gears 75, 76 and 77 mounted on shafts 78 fixed to the handle hub 79. A sun gear 80 is fixed by key 81 to shaft 74 and is in constant mesh with the planetary gears. An internal ring gear 82 is fixed by its pins 83 to a plate member 84 which is fastened by cap screws 85 to the frame F.

Means are provided for counterbalancing the weight of the spindle assembly and thus relieving the handle 9 of this weight as follows.

A clock spring 87 (FIGURES 11 and 12) is anchored at its other end in a sleeve 88 by means of a pin 89. The inner end of the spring is anchored in a slot 90 formed in the shaft 74. The sleeve 88 can be adjustably fixed in the frame F of the machine by means of a set screw 91 which extends through the frame and can be aligned with and screwed in any one of a number of apertures 92 which are circumferentially spaced around the sleeve 88. Thus the amount of biasing effect or wrap up of the clock spring can be varied to in turn vary the amount of counterbalancing desired for the spindle assembly. As this lever is pulled to lower the assembly, the spring is wound up. In other words, the weight of the spindle assembly is taken off the operator's handle 9 and the latter can be actuated in an easy manner and with a good mechanical advantage.

SPINDLE ASSEMBLY LOCK UP MECHANISM

Means will now be described for providing a positive and accurate locking mechanism for the spindle assembly (best shown in FIGURES 4, 9 and 10).

A spindle assembly lock up lever 95 is fixed to one end of the hub 96 which in turn has a shaft 97 fixed thereto by pin 98 (FIGURE 10). The end of the shaft 97 is threadably engaged in a clamp member 99. Another clamp member 100 is mounted freely on the unthreaded portion of shaft 97, but bears against a pin 101 extending through shaft 97. Snap ring 102 limits outward movement of clamp member 100 when shaft 97 is rotated to loosen clamps 99 and 100, to cause the flat inclined surfaces 103 and 104 respectively, to back off the assembly 6. In clamping position, surfaces 103 and 104 bear in line contact against the periphery of the assembly 6. These points of contact are circumferentially spaced from one another and diametrically opposed to a third line of contact 105 between the assembly 6 and the bore 5a of the ram 5. Spacer 107 and 108 complete the clamping means.

With the above construction, as the lever 95 is swung in a downward position, the clamp member 99 is drawn more fully onto the shaft 97 and against the spindle assembly. This causes the clamp member 100 to then also move and thereby bear tightly against the spindle assembly at its line of contact. This combined clamping of members 99 and 100 forces the spindle assembly 6 against the third point of contact 105. In other words the tapered clamp surfaces apply pressure on the spindle assembly and the latter is then held by the three points of contact in a particularly rigid manner.

An adjustable screw 106 is provided for limiting the outward movement of the clamp 99 when lever 95 is swung up, thereby positively causing shaft 97 to move axially toward snap ring 102, thus unclamping of the assembly. The maximum clearance between the assembly 6 and the bore 5a may be on the order of only, .0003 inch and this requires only a small amount of lever movement to effect a particularly tight and rigid clamping action.

With this particular spindle clamp construction, considerably more rigidity is built into the spindle assembly and this is particularly desirable for heavy milling operations and good finish on the workpiece (not shown). Furthermore, an exceptional good mechanical advantage is obtained by the lever acting through the threaded connection to cause clamping action.

RADIAL LOCATING MEANS FOR SPINDLE ASSEMBLY

An adjustment for the spindle assembly will now be described in detail, by means of which the spindle is located accurately in a radial direction, compensation is made for manufacturing variations, and exceptionally good stiffness of the spindle nose is provided.

This spindle nose adjustment is shown best in FIGURES 4, 5, 6, and 7 and includes a solid or one piece ring 110 which has an outer tapered surface which converges in a downward direction. This ring bears against radial shoulder 111 formed in the casing 5 by the counter bore 112. A plurality of tapered wedges 113 (in this case three such wedges are shown as being spaced 120 degrees apart) have complementary tapered surfaces which bear against the outer tapered surface of the ring. A nose ring 114 is fixed by cap screws 115 to the end of the casing and each of these wedges have a T-shaped slot 116 formed therein and opening in a downward direction. A set screw 117 is provided for each wedge and has a T-shaped head 118 which is complementary to and fits within slot 116 of the wedge. The screw 117 is rotatably engaged and extends downwardly in the nose ring and can be adjusted from the lower end of the nose ring by an Allen wrench (not shown). A lock screw 119 extends radially through the nose ring to lock each of the set screws 117 in adjusted position.

By means of the above adjustment, the lower end of the spindle assembly can be positively and quickly adjusted in its proper radial position, regardless of slight manufacturing inaccuracies that may occur between the parts, and insures radial stiffness.

DEPTH ADJUSTMENT

Means are also provided for setting the depth of cut, that is to say, for determining how far the tool will move in a downward direction. This means is shown in FIGURES 18, 19 and 20 and includes a shaft 130 mounted in anti-friction bearing 131 and 132 in the machine frame. A spiroid worm gear 133 is fixed to the shaft 130 and is in mesh with the spiroid gear 134 fixed to the shaft 74 so that it rotates with the shaft but can slide in an axial direction thereon, by the key and key way connection 135 (FIGURE 11). A depth adjusting crank handle 136 is rotatably mounted on the end of the shaft 130 and has clutch teeth 137 that are engageable with clutch teeth 138 fixed on shaft 130 by means of pin 139. A dial 140 is fixed by adjusting screw 141 to the shaft 130, and an index mark 142 is formed on the frame of the machine. With the crank wheel 136 the clutch teeth 137–138 can be engaged to rotate the dial and consequently the shaft 130 to any desired position using mark 142 as the refernece. This in turn results in the position of shaft 74 being readable by means of the dial 140. In other words the crank handle 136 determines the setting to which the shaft 74 is to be rotated by the manual downfeed lever 9.

SPIROID GEAR DISENGAGEMENT

A front handle 150 (FIGURES 11 and 18) is provided for throwing the spiroid gear 134 out of engagement with the spiroid worm 133 by means of an eccentric 15a fixed on the end of shaft 150b of the handle 150. The spiroid gear 134 includes a yoke portion 134a which is engaged by the eccentric 150a. Swinging of the lever 150 in one direction or the other causes the gear 134 to shift axially on the shaft on keyway connection 135 and into and out of engagement with the spiroid worm 133.

POWER DOWNFEED

Lever actuated cam means are also provided for clutching and declutching a power feed unit PF (FIGURE 18) to the shaft 130. This arrangement includes a sleeved clutch member 151 which is axially slideable but is keyed to and therefore non-rotatably mounted relative to shaft 152 (FIGURES 18 and 21). The eccentric pin 153 carried on the end of shaft 154 acts to shift the clutch member 151 in an axial direction when the lever 155 is oscillated. As viewed in FIGURE 21, when clutch member 151 is shifted to the right sufficiently it engages a clutch member 156 fixed on shaft 130 by the pin 157 and the power feed mechanism (which is conventional in itself) can be clutched into or declutched out of engagement with the shaft 130.

Referring to FIGURE 18, when the lever 150 has engaged the spiroid gear 134 with the spiroid gear 133, the power feed unit can then drive the spindle assembly in a downward direction. An overrunning clutch OR2 is provided in the shaft 152 for protecting the unit PF when the stop dog 153 (FIGURE 3) of the spindle assembly is fed against a positive and adjustable stop 154. The depth indicating dial 140 is also operable with the power feed arrangement.

When the power feed arrangement is to be used, the clutch members 137–138 of the depth indicating wheel 136 are disengaged by pulling the wheel 136 to the right, as viewed in FIGURE 18.

It should also be noted that the depth setting wheel 136 can also be used for hand feeding the spindle assembly in a downward direction.

The use of spiroid gears in the above arrangement for feeding in a downward direction under power provides exceptionally good load carrying ability, positive back lash control, space saving design, and results generally in a particularly efficient mechanism.

Various modes of carrying out the invention are contemplated as being within the scope of the following claims particularly pointing out and distinctly claiming the subject matter which is regarded as the invention:

1. A metalworking machine of the type having an axially movable and rotatable tool-holding spindle, drive mechanism for said spindle comprising, a drive sleeve in which said spindle is slideable, a pair of timing gears mounted on said drive sleeve for rotation therewith, an electric motor having a drive shaft extending therefrom, an adjustable sheave mounted on said drive shaft, a pair of layshafts between said motor and sleeve, an adjustable sheave mounted on one of said layshafts, a timing belt drivingly connecting said sheaves to form an infinitely variable speed drive from said motor to said one of said layshafts, timing belt and gear means connected between said one layshaft and one of said timing gears on said drive sleeve to form a high speed drive, other timing belt and gear means between said one layshaft, the other layshaft and the other of said timing gears on said sleeve to form a low speed drive, and clutch means in said drives for selecting either of said drives to drive the drive sleeve.

2. Drive mechanism as defined in claim 1 including an electric motor driven, variable speed shifter mechanism connected to said adjustable sheave mounted on said drive shaft.

3. A metalworking machine of the type having an axially movable and rotatable tool-holding spindle, drive mechanism for said spindle comprising a drive sleeve in which said spindle is slideable, an electric motor having a drive shaft extending therefrom, an adjustable sheave mounted on said drive shaft, a pair of timing gears mounted on said drive sleeve for rotation therewith, one of said gears being larger than the other, an electric clutch means between the larger gear and said sleeve, a pair of layshafts between said motor and sleeve, an adjustable sheave mounted on one of said layshafts, a timing belt drivingly connecting said sheaves to form an infinitely variable speed drive from said motor to said one of said layshafts, timing belt and gear means connected between said one layshaft and the smaller one of said timing gears on said drive sleeve to form a high speed drive, second electric clutch means between said one layshaft and said gear means; and other timing belt and gear means between said one layshaft, the other layshaft and the larger of said timing gears on said sleeve to form a low speed drive; said clutch means in said drives being selectively operable to engage either of said drives.

4. Drive mechanism as defined in claim 3 including an electric motor driven, variable speed shifter mechanism connected to said adjustatble sheave mounted on said drive shaft.

5. A metalworking machine of the type having an axially movable and rotatable tool-holding spindle, drive mechanism for said spindle comprising a drive sleeve in which said spindle is slideable, an electric motor having a drive shaft extending therefrom, an adjustable sheave mounted on said drive shaft, a pair of timing gears mounted on said drive sleeve for rotation therewith, one of said gears being larger than the other, a pair of layshafts between said motor and sleeve, an adjustable sheave mounted on one of said layshafts, a timing belt drivingly connecting said sheaves to form an infinitely variable speed drive from said motor to said one of said layshafts, an intermediate timing gear connected to said one layshaft, a second timing belt connected between said intermediate gear and the smaller one of said timing gears on said drive sleeve to form a high speed drive, a pair of timing gears on the other layshaft, a second intermediate gear on said one layshaft, a pair of timing belts between said pair of timing gears on said other layshaft, the second intermediate gear and the larger of said timing gears on said sleeve to form a low speed drive, and clutch means in said drives for selecting either of said drives to drive the drive sleeve.

6. Drive mechanism as defined in claim 5 including an electric motor driven, variable speed shifter mechanism connected to said adjustable sheave mounted on said drive shaft.

References Cited
UNITED STATES PATENTS

| | | | |
|---|---|---|---|
| 1,626,584 | 4/1927 | Reeves | 74—325 |
| 2,253,309 | 8/1941 | Smellie | 74—722 X |
| 2,779,448 | 1/1957 | Lambach et al. | 192—84 X |
| 3,048,056 | 8/1962 | Wolfram | 74—722 X |
| 3,203,279 | 8/1965 | Rahrig et al. | 74—722 |
| 3,322,249 | 5/1967 | Klinkenberg et al. | 192—84 X |

DONLEY J. STOCKING, *Primary Examiner.*

ARTHUR T. McKEON, *Examiner.*